United States Patent [19]

Beilstein

[11] Patent Number: 4,530,470
[45] Date of Patent: Jul. 23, 1985

[54] CONDIMENT DISPENSER

[75] Inventor: Kurt H. Beilstein, Langenselbold, Fed. Rep. of Germany

[73] Assignee: Hofmann GmbH, Kreuzwertheim, Fed. Rep. of Germany

[21] Appl. No.: 486,333

[22] Filed: Apr. 19, 1983

[30] Foreign Application Priority Data

Apr. 19, 1982 [DE] Fed. Rep. of Germany ....... 3214293
Dec. 6, 1982 [DE] Fed. Rep. of Germany ....... 3245065

[51] Int. Cl.³ .............................................. B02C 19/12
[52] U.S. Cl. ................................ 241/169.1; 222/142.7
[58] Field of Search ............... 222/142.1, 142.2, 142.3, 222/142.4, 142.5, 142.6, 142.7, 142.8, 142.9; 241/168, 169, 169.1, 169.2

[56] References Cited

U.S. PATENT DOCUMENTS 4,369,901  1/1983  Hidding ....................... 222/142.7 X

FOREIGN PATENT DOCUMENTS 1749181  5/1957  Fed. Rep. of Germany .
2222865 11/1973  Fed. Rep. of Germany ... 241/169.1
2413900  9/1975  Fed. Rep. of Germany ..... 22/142.9
7802542  5/1978  Fed. Rep. of Germany .
2818216 11/1978  Fed. Rep. of Germany ... 241/169.1
335816  3/1959  Switzerland ..................... 222/142.7

Primary Examiner—Mark Rosenbaum

[57] ABSTRACT

A cylindrical condiment dispenser has condiment compartments of annular segment-shaped cross section arranged concentrically around a central chamber. A grinding mechanism which is arranged in the bottom of the chamber is operable by means of a ring, which is rotatable relative to the box. The cover of the condiment dispenser is constructed so that a condiment can be sprinkled out of each of the condiment compartments selectively.

10 Claims, 8 Drawing Figures

CONDIMENT DISPENSER

BACKGROUND OF THE INVENTION

This invention relates to a condiment dispenser which contains in one unit at least one condiment compartment provided with a sprinkler outlet for a condiment which can be sprinkled, and a condiment mill with a grist chamber, and wherein the grist outlet is located at an end face of the unit. Such a condiment dispenser is described, for example, in German Gebrauchsmuster No. 1,749,181.

In a known condiment dispenser, a salt sprinkler is placed on a pepper mill. It is a disadvantage of such a combination that it inevitably has a relatively great overall height, and that in order to recharge the pepper mill the salt sprinkler as a whole must be demounted from the pepper mill. In addition the through-linkage of the grinding mechanism must be demounted so that the cover of the grinding mechanism can be removed. It is then possible for the grinding mechanism to fall downwards out of the pepper mill. It is also frequently desired to combine more than one condiment sprinkler with a condiment mill to form a unit. This is impossible by the principle of construction described in German Gebrauchsmuster No. 1,749,181.

SUMMARY OF THE INVENTION

The underlying object of the invention is to develop a condiment dispenser of the type initially stated, which is particularly compact, permits a plurality of different condiment sprinklers to be combined with a condiment mill, and is optimally simple to handle.

This object is achieved according to the invention in that the condiment compartments and the condiment mill are arranged juxtaposed in a common box.

The principal advantage of the invention lies in the fact that the condiment dispenser according to the invention is extremely compact and need not exhibit a greater height than a normal condiment sprinkler or a customary pepper mill. The principle of construction underlying the invention immediately permits the condiment dispenser to be provided for more than one sprinkleable condiment, in that, for example, six condiment compartments are arranged juxtaposed. No parts of the grinding mechanism or the condiment compartments need be demounted when recharging.

It is particularly favorable if the condiment dispenser is provided cylindrically and the chamber holding the material to be ground concentrically therein as a cylindrical chamber and if a plurality of condiment compartments are arranged annularly around the grist chamber.

The handling of the condiment dispenser is rendered particularly simple if, according to another preferred development of the invention, the condiment dispenser has for its operation a ring rotatable relative to the box, the lower end face of which forms the base surface of the condiment dispenser. When used as a mill, such a condiment dispenser is simply raised and held over the food to be seasoned. The ring is then rotated so that the ground material can trickle out of the condiment mill onto the food to be seasoned.

The selection of the desired condiment in the condiment compartments can be made particularly simply by using a rotatable cover with a passage which can be brought selectively into coincidence with any one of the sprinkler outlets by rotating the cover. An alternative embodiment to the rotatable cover is the use of flaps provided in the cover to close the sprinkler outlets of the condiment compartments.

If the flaps are constructed integrally with a separate plastic component to close the individual condiment compartments, then this plastic component may be used simultaneously to close the charging aperture of the chamber.

The chamber can be opened and closed particularly simply by providing a central hole in the base element as an outlet for the chamber and the plastic component can engage into this hole by a neck piece.

The principle of the invention permits wide scope for variation.

It may be advantageous from the design standpoint if the condiment dispenser is polyhedral in the region of the condiment compartments and chamber.

In another embodiment, the state of charge of the chamber is easily detectable, a sight chamber for the chamber being provided.

If it is desired to close the box with a cover exhibiting individual flaps instead of a rotatable cover, then it is advantageous if a charging aperture for the chamber is provided on the end face of the box in the region of the enlargement. One of the flaps can then serve to close the charging aperture.

In another embodiment, there is the possibility of selectively using one-way mills with different material to be ground. The configuration of the condiment mill as a one-way mill is advantageous because the grinding mechanism of a condiment mill can wear and the replacement of the grinding mechanism is convenient after a charge of material to be ground has been milled, particularly if it consists of plastics exactly like the remainder of the condiment mill.

BRIEF DESCRIPTION OF THE DRAWINGS

The invention is susceptible to numerous embodiments. A number of these are illustrated in the drawings and described below. In the drawings.

Figure 1:
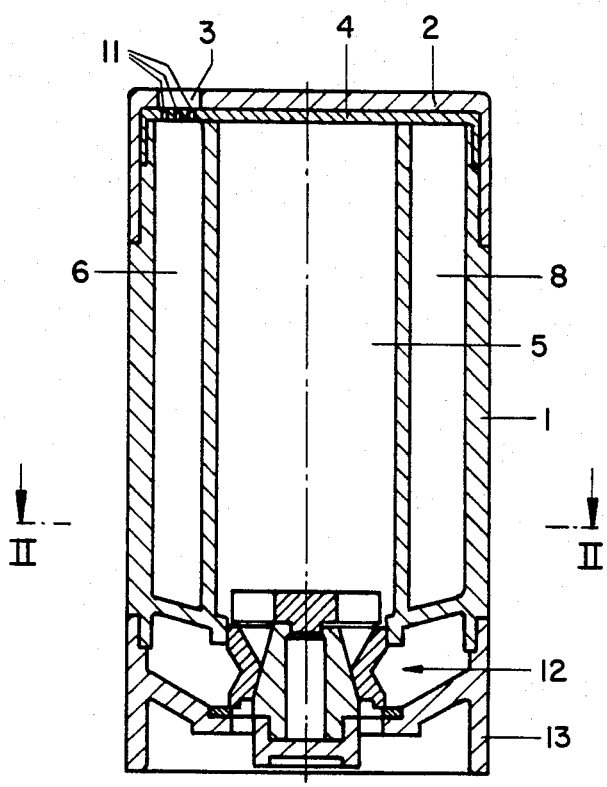
FIG. 1 shows a longitudinal section through a condiment dispenser according to the invention.
Figure 2:
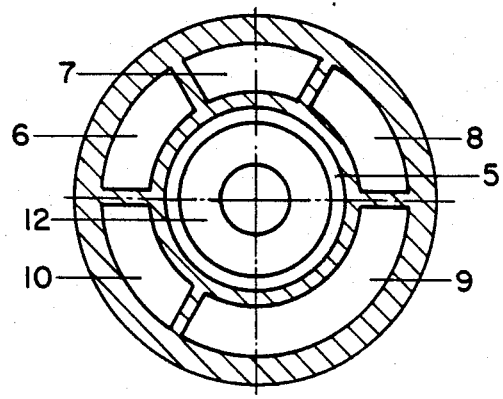
FIG. 2 shows a cross section along the line II—II of the condiment dispenser according to FIG. 1.

The condiment dispenser illustrated in the figures has a box 1, onto which a cover 2 is placed removably and rotatably from above. The cover 2 has a passage 3 near its outer rim and rests upon an intermediate cover 4. This intermediate cover 4 covers both a chamber 5 provided centrally in the box and also condiment compartments 6–10. The condiment compartments 6–10 have upper sprinkler outlets 11. By rotating the cover 2, the passage 3 can be brought into coincidence with the respective sprinkler outlets associated with one of the condiment compartments 6–10, so that condiment can be shaken out of the relevant condiment compartments 6–10. Further details of the configuration of the condiment dispenser as regards the cover 2, the intermediate cover 4 and the condiment compartments 6–10 may be taken from German Gebrauchsmuster No. 78 02 542. The sprinkler outlets may also be provided in the envelope surface of the box 1 instead of in the end face, if the cover has a corresponding passage in its envelope surface.

A grinding mechanism 12, into which material to be ground from the chamber 5 can pass, is arranged in the bottom of the chamber 5. A ring 13 of approximately the same diameter as the housing 1 is retained rotatably on the bottom of the housing 1 and serves to operate the grinding unit 12 by manual rotation. When the condiment dispenser is raised and the ring 13 is rotated, ground material then trickles out from it at the bottom.

Figure 3:
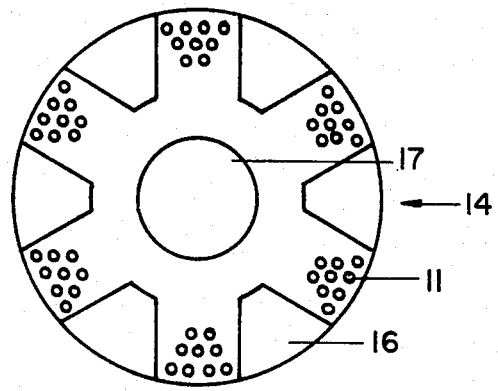
FIG. 3 shows a top plan of a variant embodiment of a base element of a cover of the condiment dispenser.
Figure 4:
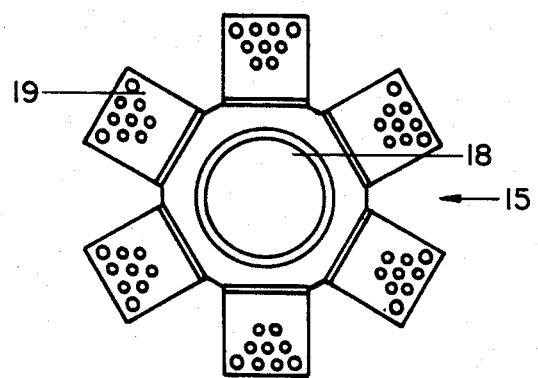
FIG. 4 shows a plastic component to be inserted into the base element according to FIG. 3, viewed in plan.
Figure 5:
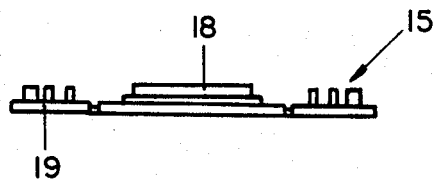
FIG. 5 shows the plastic component according to FIG. 4 in side elevation.

FIG. 3 shows a base element 14, which conjointly with a plastic component 15, which is illustrated in FIGS. 4 and 5, can replace the cover 2 and the intermediate cover 4 according to FIG. 1.

The base element 14 has externally approximately triangular raised regions 16, between which the sprinkler outlets 11 of the individual condiment compartments are located. In the central region the base element 14 has a cylindrical hole 17 through which the chamber 5 can be charged.

The plastic component 15 illustrated in FIGS. 4 and 5 should be placed on the base element 14 so that it fits by a central short neck piece 18 in the hole 17 and can close the sprinkler outlets 11 of the condiment compartments with flaps 19. When it is desired to remove condiment from a condiment compartment, it is only necessary to open the associated flap 19 by raising it. When it is desired to recharge material to be ground into the chamber 5, then the entire plastic component 15 is removed from the base element 14, so that the hole 17 is exposed.

Figure 6:
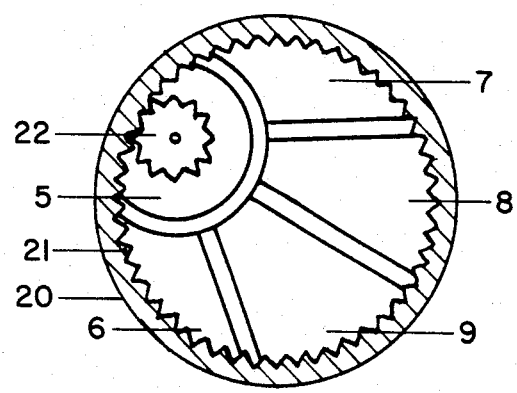
FIG. 6 shows a cross section through a further embodiment of the condiment dispenser according to the invention.

FIG. 6 shows that the chamber 5 may also be arranged eccentrically in the condiment dispenser. In this case an operating ring 20, which is retained rotatably on the box 1 precisely like the ring 13 according to FIG. 1, serves to drive the grinding mechanism of the condiment mill. However, in this embodiment the operating ring 20 exhibits an internal tooth system 21 which meshes with a pinion 22 through which the grinding mechanism is driven. The condiment dispenser according to FIG. 6 exhibits, in addition to the chamber 5, four condiment compartments 6, 7, 8 and 9, the condiment compartment 8 being substantially larger than the condiment compartments 6 and 7 and being able to serve, for example, for storing salt.

Figure 7:
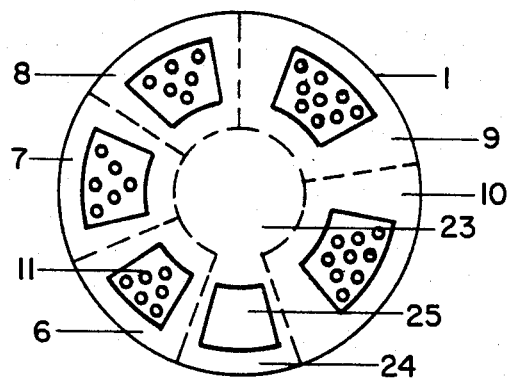
FIG. 7 shows a view of a variant embodiment of a condiment dispenser according to the invention.
Figure 8:
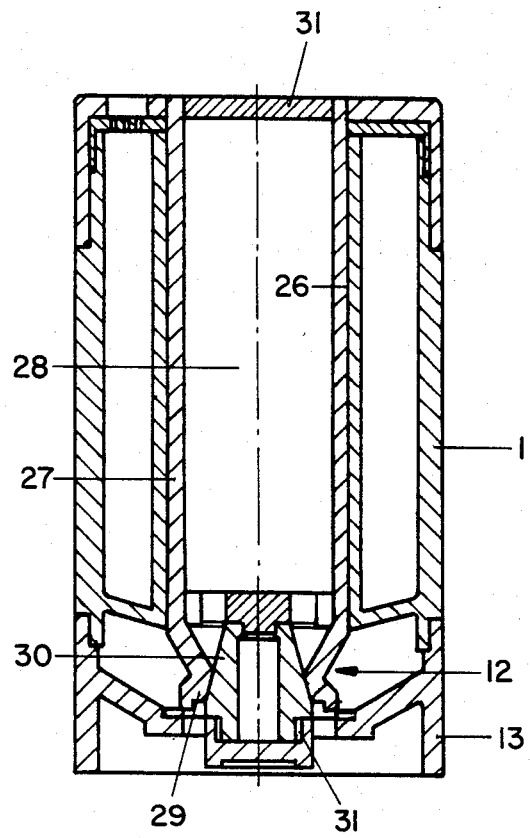
FIG. 8 shows a longitudinal section through a further embodiment of the invention.

In the embodiment according to FIG. 7, a central chamber 23 for the material to be ground has an enlargement 24, which extends to the envelope surface of the box 1. Condiment compartments 6–10 with sprinkler outlets 11 are again arranged annularly around the chamber 23. However, instead of a sprinkler outlet in the region of the enlargement 24 on the end face of the box 1, a charging aperture 25 is provided, which may, for example, be closable by one of the flaps 19 shown in FIGS. 4 and 5.

In the embodiment according to claim 8, the condiment dispenser has a central shaft 26 instead of a central cylindrical chamber for the material to be ground. A one-way mill 27 is inserted into this shaft 26 from above. It has a chamber 28 and a grinding mechanism 12 which consists of a stationary grinding cone 29 and a rotatable cone 30. When the one-way mill 27 is pushed into the shaft 26, the cone 30 meshes by a tooth system 31 into a corresponding tooth system of the ring 13. A rotation of the ring 13 therefore leads to a rotation of the cone 30 and hence to an operation of the one-way mill 27.

The one-way mill is closed upwards by a plug 31. It is obviously also possible to close the one-way mill 27 by means of a flap or in any other desired manner.

What is claimed is:

1. A condiment dispenser comprising a tubular housing, a semitubular wall having a pair of longitudinal end edges, and a plurality of dividing walls connecting said semitubular wall to said housing for dividing said housing into a mill chamber and a plurality of juxtaposed condiment compartments arranged annularly about said mill chamber, said condiment compartments being separated from each other and from said mill chamber by said walls, two of said dividing walls connecting said semitubular wall end edges to said housing to define an enlarging chamber connecting said mill chamber to said housing so said mill chamber extends with an enlargement to said housing, and a condiment mill connected to said mill chamber for material to be ground by said mill and provided with an outlet for ground material located at a lower end face of the dispenser, said condiment mill being provided with a rotatable ring relative to said housing, the lower end face of said ring forming the base surface of the condiment dispenser, and a cover releasably secured to said housing, said cover including sprinkling apertures located to cooperate with each condiment compartment so condiments can be discharged from said condiment compartments via said cover, said cover further including a charging aperture on said cover adjacent to at least one of said sprinkling apertures and located to cooperate with said enlarging chamber so material to be ground in said mill can be charged into said mill chamber via said enlarging chamber, said cover further including a closure means associated with each aperture for closing said end aperture.

2. A condiment dispenser as claimed in claim 1, wherein said housing is cylindrical in shape, said mill chamber being disposed concentrically therein as a cylindrical chamber.

3. A condiment dispenser as claimed in claim 1, wherein said housing comprises at its upper end a rotatable cover having a passage which can be brought selectively into coincidence with any one of said condiment compartments by rotating the cover.

4. A condiment dispenser as claimed in claim 1, wherein flaps are provided in the cover to close the sprinkler apertures.

5. A condiment dispenser as claimed in claim 4, wherein said flaps are constructed integrally with a separate plastic component which is disposable on a base element of said cover.

6. A condiment dispenser as claimed in claim 5, wherein a central hole is provided in said base element to provide an opening for said mill chamber and said plastic component is engageable with said hole.

7. A condiment dispenser as claimed in claim 5, wherein said condiment mill meshes by means of a pinion with an internal tooth system of an operating ring which is retained rotatably on said housing.

8. A condiment dispenser as claimed in claim 1, wherein said condiment mill is arranged eccentrically in the housing.

9. A condiment dispenser as claimed in claim 1, wherein said housing is of polyhedral shape in the region of said condiment compartments and said mill chamber.

10. A condiment dispenser as claimed in claim 1, wherein said condiment mill is coupled by a shaft in said housing to said rotatable ring.

* * * * *